(12) United States Patent
Hakansson

(10) Patent No.: US 6,405,391 B1
(45) Date of Patent: Jun. 18, 2002

(54) BUNK ARRANGEMENT IN A TRUCK CAB

(75) Inventor: Anders Hakansson, Klippan (SE)

(73) Assignee: Klippan Safety AB, Klippan (SE)

( * ) Notice: Subject to any disclaimer, the term of this patent is extended or adjusted under 35 U.S.C. 154(b) by 0 days.

(21) Appl. No.: 09/615,990

(22) Filed: Jul. 14, 2000

(30) Foreign Application Priority Data

Jul. 15, 1999 (SE) .............................................. 9902702

(51) Int. Cl.[7] ................................................. B60T 3/38
(52) U.S. Cl. .......................... 5/118; 296/24.1; 280/749; 297/487
(58) Field of Search .............................. 5/118, 424, 425, 5/427, 428, 429, 430, 94; 280/748, 749; 297/485, 487, 488, 464; 296/24.1

(56) References Cited

U.S. PATENT DOCUMENTS

| | | | |
|---|---|---|---|
| 5,375,879 A | * 12/1994 | Williams et al. | 280/749 |
| 5,529,341 A | * 6/1996 | Hartigan | 280/749 |
| 5,536,024 A | * 7/1996 | Williams et al. | 280/749 |
| 5,820,187 A | * 10/1998 | Ament et al. | 296/24.1 |
| 5,839,757 A | * 11/1998 | von Lange et al. | 280/749 |
| 5,876,059 A | * 3/1999 | Kleinberg | 280/749 X |
| 5,954,380 A | * 9/1999 | Ament et al. | 296/24.1 |
| 5,971,433 A | * 10/1999 | Ament et al. | 280/749 |
| 6,155,621 A | * 12/2000 | Nishida et al. | 296/24.1 |

* cited by examiner

Primary Examiner—Jack Lavinder
Assistant Examiner—James M. Hewitt
(74) Attorney, Agent, or Firm—James Ray & Associates

(57) ABSTRACT

A bunk for a bunk arrangement in a truck cab has at a free edge vertical safety belts preferably attached to the ceiling of the cab, and a safety net. At its free edge the bunk has a longitudinal cartridge for the safety net. A net rod at the upper edge of the net has a locking device at each belt, the locking device guiding the rod along the belt and locking it thereto unless manually released against spring bias.

12 Claims, 2 Drawing Sheets

BUNK ARRANGEMENT IN A TRUCK CAB

CROSS REFERENCE TO RELATED APPLICATIONS

Priority is claimed from Swedish patent application No. 9902702-1 filed Jul. 15, 1999.

FIELD OF THE INVENTION

The present invention relates to a bunk arrangement for a truck cab, the bunk having at a free edge thereof substantially vertical safety belts, preferably attached to the ceiling of the cab, and a safety net.

BACKGROUND OF THE INVENTION

A modern cab for a large truck or the like is normally provided with at least one bunk in a cab space behind the driver's seat. The purpose of the bunk is to allow a second driver to sleep or rest, while a first driver is driving the truck, so that stops on a long journey can be kept at a minimum.

The bunk must be provided with safety equipment of the kind mentioned initially, so that both the person in the bunk and the driver in front of him are reasonably protected in the event of a collision or the like.

In earlier designs the safety net has normally been held up in its protective position by means of elastic straps or the like, preferably arranged at the safety belts. When not used, the net can be held down towards the bunk edge by means of bands or similar means. Experience shows that the use of nets of this kind is somewhat awkward and that objects may become entangled in the net. Further, such nets, generally, do not have a neat appearance.

SUMMARY OF THE INVENTION

A bunk arrangement without the drawbacks mentioned above is, according to the invention, attained in that the bunk at its free edge has a longitudinal cartridge for the safety net and that a net rod at the upper edge of the net has a locking device at each safety belt, the locking device guiding the rod along the belt and locking it thereto unless manually released against spring bias.

When the net is not used, it is concealed in the cartridge. When it is to be used, it is simply lifted by the rod along the belts and automatically locked in the desired position by the locking devices.

The cartridge, preferably, an aluminum extrusion, preferably, has a spring biased shaft for rolling up the safety net.

In many cases it may be desired to pivot the bunk up for increasing the available space under it when it is not in use. For this purpose conventional retractors for the safety belts can be arranged in the cartridge, and release knobs for the retractors can be arranged on the cartridge.

THE DRAWINGS

Figure 1:
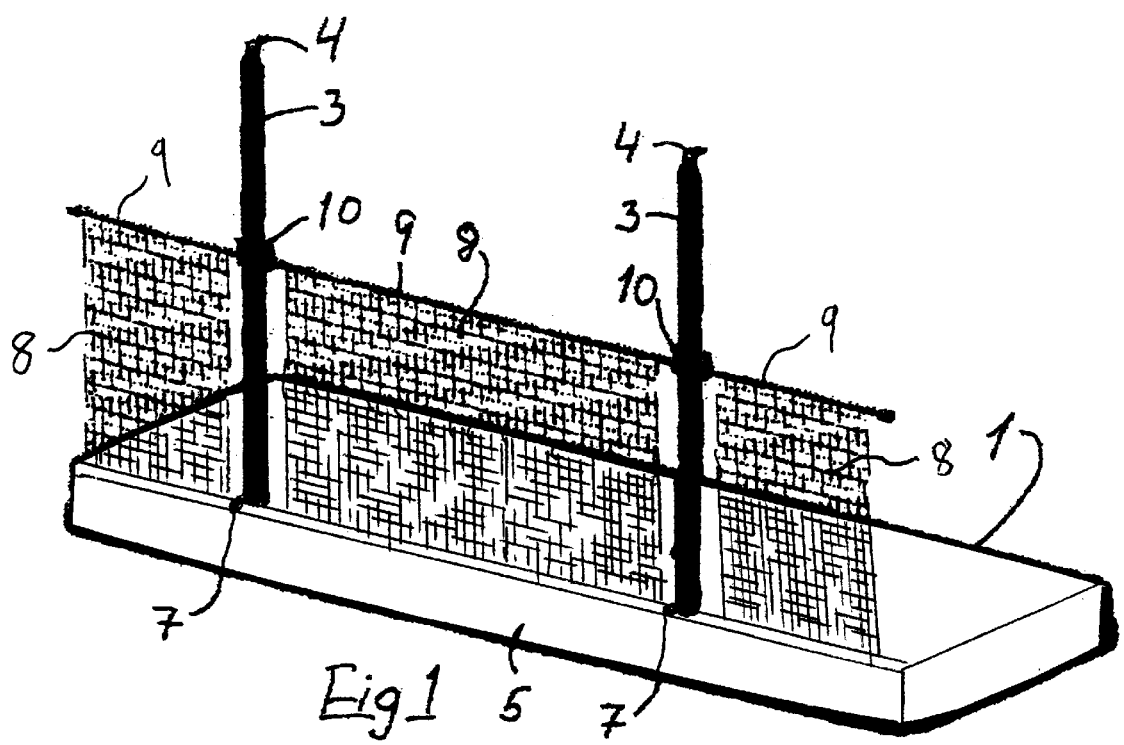
Figure 2:
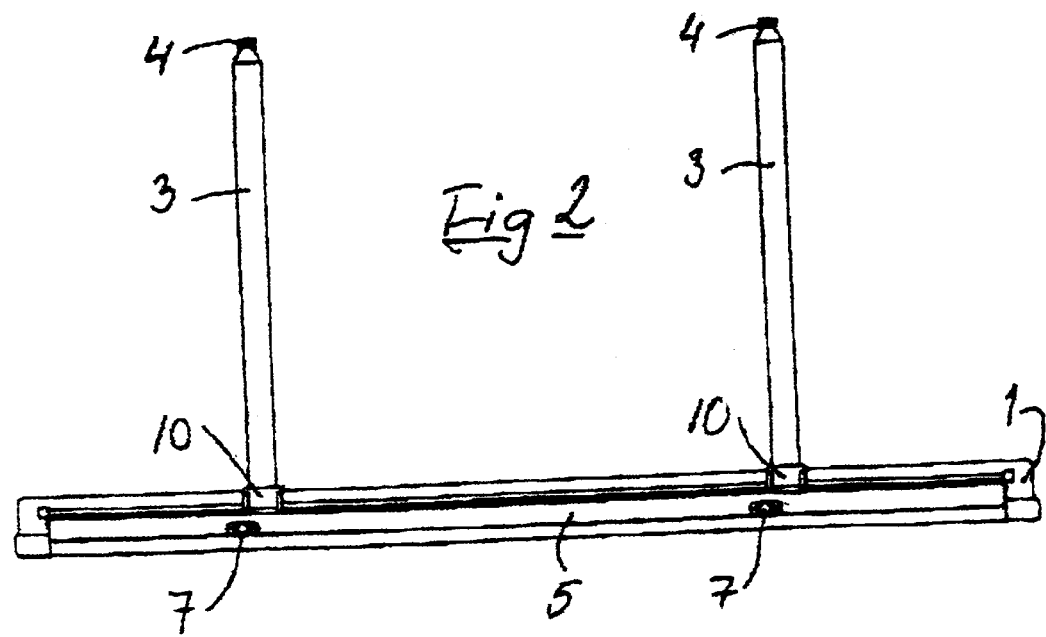
Figure 3:
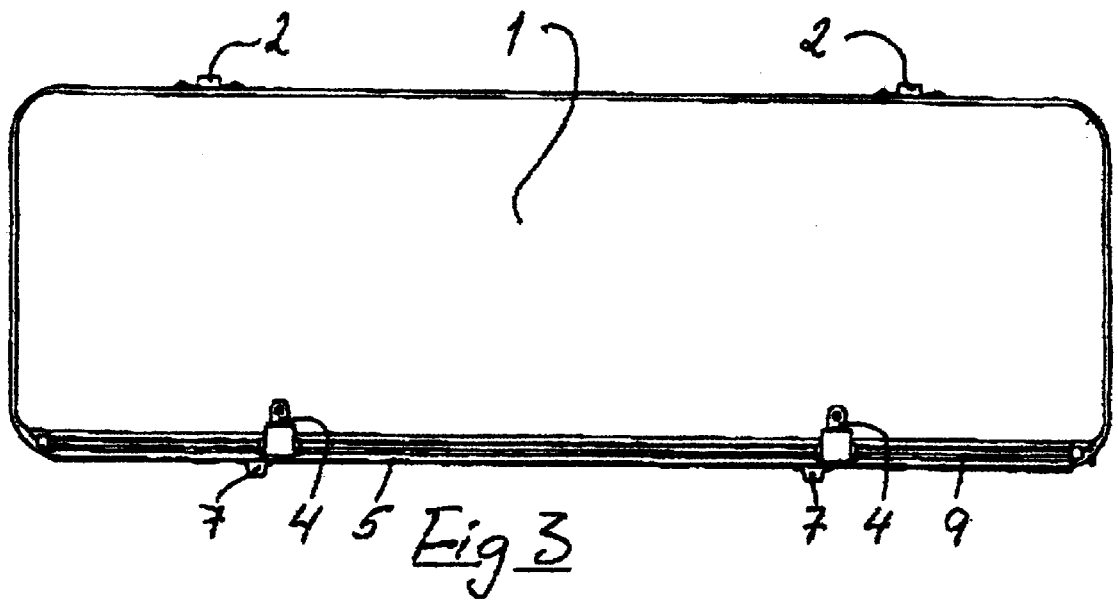
Figure 4:
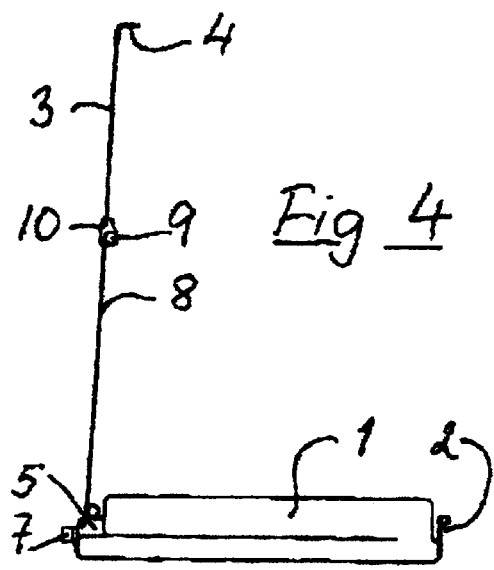
Figure 5:
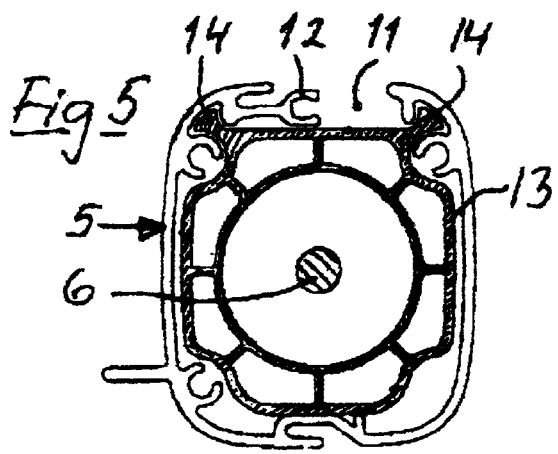

The invention will be described in further detail below under reference to the accompanying drawings, in which FIG. 1 is a perspective view of a truck bunk arrangement according to the invention, FIG. 2 is a front view of the arrangement of FIG. 1, FIG. 3 is a top view of the arrangement of FIG. 1, FIG. 4 is a side view of the arrangement of FIG. 1, and FIG. 5 is a section to a larger scale through the cartridge for a bunk arrangement shown in FIG. 1.

DETAILED DESCRIPTION OF THE PRESENTLY PREFERRED EMBODIMENT

A bunk 1 is to be mounted transversely in a cab (not shown) of a truck (not shown) behind the driver's seat (not shown). In bunk 1, a second driver can sleep or rest, so that the truck can be driven with as few stops as possible. It is of great importance that the safety in the cab is satisfactory both for the driver and for the person resting in bunk 1.

Bunk 1, preferably, is pivotally attached to a back wall (not shown) of the truck cab by means of lugs 2 (FIGS. 3 and 4).

At its opposite side, i.e., its front edge facing the driver's seat, bunk 1 is suspended from the ceiling of the cab by means of, preferably, two support belts or safety belts 3. For this purpose belts 3 have attachments 4 at their upper ends.

Bunk 1 is, at its front edge, provided with a cartridge 5, which appears in all Figs. but is shown in section to a larger scale in FIG. 5. Cartridge 5 is, preferably, an aluminum extrusion having the profile shown in FIG. 5.

A conventional retractor (not shown) for each belt 3 is arranged in cartridge 5, in which a shaft 6 is rotatably arranged in a way to be described. Each retractor can be released from a locked position by means of a release knob 7 on the front side of cartridge 5.

Wound on the rotatable shaft 6 in cartridge 5 is a safety net 8 (FIG. 1), which at its upper edge is attached to a net rod 9. Cartridge 5 thus functions as a container for the net 8. The net is shown retracted into cartridge 5 in FIG. 2.

The net rod 9 is provided with an upper locking device 10 for each belt 3. This locking device 10 is arranged on the belt 3 and thus has the two-fold purpose of guiding the rod 9 along the belt and automatically locking it thereto unless manually released by depression of a handle.

The rotatable shaft 6 in cartridge 5 is spring biased, so that net 8 is automatically wound into cartridge 5, when the upper locking devices 10 are released.

With the net 8 wound onto the shaft 6 in cartridge 5 and its net rod 9 in a rest position against cartridge 5, as is shown in FIG. 2, it is easy for a person to enter bunk 1. The net 8 can then easily be lifted to the position shown in FIG. 1 by net rod 9, which will automatically be locked to the belts 3 by the upper locking devices 10. In this position net 8 will add to the security provided by the belts 3.

If bunk 1 is to be pivoted upwardly around the lugs 2 in order to provide more space thereunder, the unlocking knobs 7 are pressed so that the belt retractors in the cartridge 5 can pull in the desired belt length. If the net 8 hereby is in its lifted position, it will at its lower portion be wound on the shaft 6 by the spring bias.

It is of great importance that cartridge 5 can withstand the forces to which it may be exposed during a possible collision. Due to the construction of the cartridge 5 with a longitudinal slot 11 for the net 8 and with comparatively long unsupported lengths, difficulties were encountered regarding the strength of cartridge 5.

In order to give cartridge 5 an increased strength in the area of the slot 11 at least some of the inserts 13, preferably, have ears 14 fitting into corresponding channels of cartridge 5 at either side of the slot 11.

Practical tests have shown that a cartridge with a profile as described above having inserts 13 can withstand test values of at least 80 kg and 20 G.

Cartridge 5 is shown in section in FIG. 5. A longitudinal brush (not shown) for partly closing the slot 11, preferably, is attached to a cartridge attachment 12. As already mentioned, a shaft 6 is provided in cartridge 5 for the net 8 and for the belt retractors. The shaft 6 is journalled in cartridge 5 by means of plastic inserts 13 having an external shape conforming to the internal shape of the cartridge 5 and each having, preferably, a central hole for the shaft 6.

While a presently preferred embodiment of the instant invention has been described in detail above in accordance the patent statutes, it should be recognized that various other modifications and adaptations of the invention may be made by those persons who are skilled in the relevant art without departing from either the spirit of the invention or the scope of the appended claims.

I claim:

1. A bunk arrangement for a truck cab, said bunk arrangement comprising:
    a bunk having a plurality of substantially vertical support members at a free edge of said bunk;
    a safety net positionable along said free edge of said bunk;
    a longitudinal cartridge for storage of said safety net, said cartridge disposed along said free edge of said bunk;
    a net rod connected to an upper edge of said safety net; and
    at least one locking device arranged on at least one of said support members for guiding said rod along said at least one of said support members and for locking said rod thereto, said locking device is manually releasable against a spring bias which tends to keep said locking device in a locked position.

2. A bunk arrangement, according to claim 1, further comprising lugs for attaching an attachable edge of said bunk to a wall of said truck cab.

3. A bunk arrangement, according to claim 1, wherein said substantially vertical support members are belts.

4. A bunk arrangement, according to claim 3, characterized in that retractors for seat belts are arranged in said cartridge and that release knobs for said retractors are arranged on said cartridge.

5. A bunk arrangement, according to claim 1, wherein said substantially vertical support members have attachments for attaching said vertical support members to a ceiling of said cab.

6. A bunk arrangement, according to claim 1, wherein said plurality of support members is two support members.

7. A bunk arrangement, according to claim 6, wherein said at least one locking device is two locking devices.

8. A bunk arrangement, according to claim 1, wherein said cartridge has a longitudinal slot for said net.

9. A bunk arrangement, according to claim 8, further having:
    a spring biased shaft for rolling up said safety net; and
    a plurality of inserts disposed within said cartridge, said inserts having an external shape fitting within an internal shape of said cartridge, each of said inserts having a hole for said shaft.

10. A bunk arrangement, according to claim 9, wherein said experts further have ears to fit within corresponding channels at either side of said slot in said carriage.

11. An bunk arrangement, according to claim 1, characterized in that said cartridge has a spring biased shaft for rolling up said safety net.

12. A bunk arrangement, according to claim 1, characterized in that said cartridge is an aluminum extrusion.

* * * * *